(12) United States Patent
Nguyen et al.

(10) Patent No.: US 12,375,624 B2
(45) Date of Patent: Jul. 29, 2025

(54) ACCENT CONVERSION FOR VIRTUAL CONFERENCES

(71) Applicant: Zoom Video Communications, Inc., San Jose, CA (US)

(72) Inventors: Tuan Nam Nguyen, Karlsruhe (DE); Alexander Waibel, Sammamish, WA (US)

(73) Assignee: Zoom Communications, Inc., San Jose, CA (US)

( * ) Notice: Subject to any disclaimer, the term of this patent is extended or adjusted under 35 U.S.C. 154(b) by 212 days.

(21) Appl. No.: 18/102,916

(22) Filed: Jan. 30, 2023

(65) Prior Publication Data

US 2024/0098218 A1    Mar. 21, 2024

Related U.S. Application Data

(60) Provisional application No. 63/406,942, filed on Sep. 15, 2022.

(51) Int. Cl.
| | | |
|---|---|---|
| *H04N 7/15* | (2006.01) | |
| *G10L 15/06* | (2013.01) | |
| *G10L 21/007* | (2013.01) | |
| *G10L 21/013* | (2013.01) | |
| *H04N 7/14* | (2006.01) | |

(52) U.S. Cl.
CPC .......... *H04N 7/157* (2013.01); *G10L 15/063* (2013.01); *G10L 21/007* (2013.01); *H04N 7/147* (2013.01); *H04N 7/152* (2013.01); *G10L 2021/0135* (2013.01)

(58) Field of Classification Search
CPC ........ H04N 7/157; H04N 7/147; H04N 7/152; G10L 15/063; G10L 21/007; G10L 2021/0135; G10L 13/02; G10L 13/047
See application file for complete search history.

(56) References Cited

U.S. PATENT DOCUMENTS

| | | | |
|---|---|---|---|
| 11,134,217 B1 * | 9/2021 | Goel | G06V 40/174 |
| 2011/0282669 A1 * | 11/2011 | Michaelis | G10L 25/90 |
| | | | 704/270 |
| 2018/0174595 A1 | 6/2018 | Dirac | |
| 2022/0122579 A1 * | 4/2022 | Biadsy | G10L 25/30 |
| 2022/0358903 A1 * | 11/2022 | Serebryakov | G10L 13/033 |
| 2022/0415340 A1 * | 12/2022 | Barhate | G10L 21/0364 |

(Continued)

OTHER PUBLICATIONS

"Github v0.2.1", Available Online at: https://github.com/coqui-ai/TTS/releases/tag/v0.2.1, Aug. 31, 2021, pp. 1-2.

(Continued)

*Primary Examiner* — Stella L. Woo
(74) *Attorney, Agent, or Firm* — Kilpatrick Townsend & Stockton LLP

(57) ABSTRACT

One example method includes receiving, during a virtual conference hosted by a virtual conference provider, a first audio stream comprising speech having first speech patterns according to a first accent, the first audio stream received from a first client device associated with a first participant in the virtual conference; generating, by a first trained machine learning ("ML") model, a second audio stream comprising the speech having second speech patterns according to a second accent; and outputting the second audio stream.

18 Claims, 13 Drawing Sheets

(56) References Cited

U.S. PATENT DOCUMENTS

2023/0223011 A1     7/2023   Golman
2024/0355346 A1*   10/2024   Lubin ..................... G10L 17/02

OTHER PUBLICATIONS

Casanova, et al., "YourTTS: Towards Zero-Shot Multi-Speaker TTS and Zero-Shot Voice Conversion for Everyone", Proceeding of the 39th International Conference on Machine Learning, Apr. 30, 2023, 9 pages.

Kim, et al., "Conditional Variational Autoencoder with Adversarial Learning for End-to-End Text-to-Speech", Proceedings of the 38th International Conference on Machine Learning, Jun. 11, 2021, 15 pages.

Kim, et al., "Glow-TTS: A Generative Flow for Text-to-Speech via Monotonic Alignment Search", Available Online at: https://arxiv.org/abs/2005.11129, Oct. 23, 2020, pp. 1-14.

Kolluru, et al., "Generating Multiple-accent Pronunciations for TTS using Joint Sequence Model Interpolation", Interspeech, Sep. 14-18, 2014, pp. 1273-1277.

Kong, et al., "HiFi-GAN: Generative Adversarial Networks for Efficient and High Fidelity Speech Synthesis", 34th Conference on Neural Information Processing Systems (NeurIPS 2020), Oct. 23, 2020, pp. 1-14.

Nguyen, et al., "Accent Conversion using Pre-trained Model and Synthesized Data from Voice Conversion", Interspeech, Sep. 18-22, 2022, pp. 2583-2587.

Nguyen, et al., "KIT's IWSLT 2021 Offline Speech Translation System", Proceedings of the 18th International Conference on Spoken Language Translation, Aug. 5-6, 2021, pp. 125-130.

Pham, et al., "Adaptive Multilingual Speech Recognition with Pretrained Models", Interspeech, Available Online at: https://arxiv.org/abs/2205.12304, May 24, 2022, 5 pages.

Pham, et al., "Efficient Weight Factorization for Multilingual Speech Recognition", Available Online at: https://arxiv.org/abs/2105.03010, May 7, 2021, 5 pages.

Pham, et al., "KIT's IWSLT 2020 SLT Translation System", Proceedings of the 17th International Conference on Spoken Language Translation, Jul. 9-10, 2020, pp. 55-61.

Ren, et al., "FastSpeech: Fast, Robust and Controllable Text to Speech", 33rd Conference on Neural Information Processing Systems (NeurIPS 2019), Nov. 20, 2019, pp. 1-13.

Vaswani, et al., "Attention is All you Need", 31st Conference on Neural Information Processing Systems (NIPS 2017), Dec. 6, 2017, pp. 1-15.

Zhao, et al., "L2-ARCTIC: A Non-Native English Speech Corpus", Interspeech, Sep. 2018, 7 pages.

Kumar, et al., "Learning Robust Latent Representations for Controllable Speech Synthesis", Cornell University Library, May 10, 2021, 10 pages.

Li, et al., "Neural Speech Synthesis with Transformer Network", Proceedings of the AAAI Conference on Artificial Intelligence, Sep. 1, 2018, 8 pages.

Melechovsky, et al., "Learning Accent Representation with Multi-Level VAE Towards Controllable Speech Synthesis", Institute of Electrical and Electronics Engineers Spoken Language Technology Workshop, Jan. 9, 2023, pp. 928-935.

Nguyen, et al., "Syntacc : Synthesizing Multi-Accent Speech by Weight Factorization", Institute of Electrical and Electronics Engineers International Conference on Acoustics, Jun. 4, 2023, 5 pages.

PCT/US2024/028469, "International Search Report and Written Opinion", Aug. 26, 2024, 13 pages.

* cited by examiner

ACCENT CONVERSION FOR VIRTUAL CONFERENCES

CROSS-REFERENCE

This application claims priority to U.S. Provisional Patent Application 63/406,942, filed Sep. 15, 2022, titled "Accent Conversion for Virtual Conferences," the entirety of which is incorporated herein by reference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
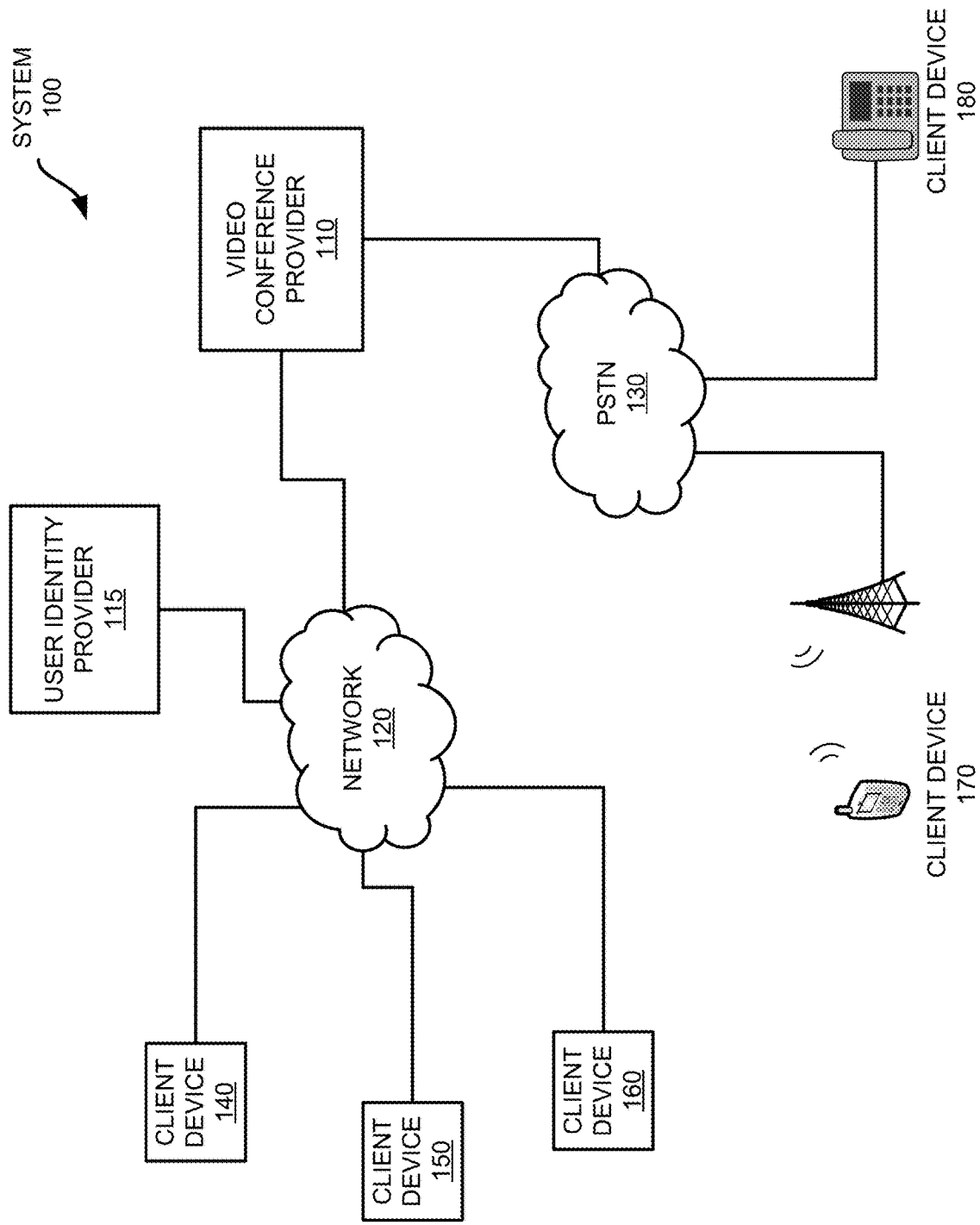
FIGS. 1-2 show example systems for accent conversion for virtual conferences.

Examples are described herein in the context of accent conversion for virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically such participants will interact in a virtual conference using a camera and microphone, which provides video and audio streams (each a "media" stream; collectively "multimedia" streams) that can be delivered to the other participants by the virtual conference provider and be displayed via the various client devices' displays or speakers. However, because virtual conferences allow participants to connect from anywhere in the world, different participants may have different native languages. As a result, even when all the participants are speaking a common language, they may each accent that common language differently. Thus, the common language can sound markedly different depending on which speaker is talking. For example, the English language is spoken by a wide variety of people with many different accents, even by native speakers within the same country. Further, different participants may have difficulty understanding the common language when it is spoken with an unfamiliar accent.

To help alleviate this issue, a virtual conference provider may maintain one or more trained machine-learning ("ML") models that can accept speech that has one accent and convert it to speech having another accent, while retaining both the content of the original speech and the identity characteristics of the original speaker's voice. Thus, the speech sounds as if it was spoken by the speaker, but with a different accent (e.g., the accent of a participant of the virtual conference other than the speaker).

To enable ML models to perform this accent conversion ("AC"), the virtual conference provider can obtain speech samples from multiple people having different accents that may be representative of a particular group of speakers. For example, the virtual conference provider may record multiple people with different accents reading the same sets of words or phrases in a common language. It can then provide each recording to a ML model trained to perform voice conversion ("VC"). The VC ML model (or "VC model)" accepts speech from one speaker and converts it to sound like it was spoken by a different speaker. This can be used to generate a set of recordings with different accents, but that all sound as if they were spoken by the same speaker. Thus, the various recordings from the group of speakers can be used to generate a rich set of training data for an AC ML model (or "AC model").

To train the AC model, pairs of recorded speech are provided to the AC model. Each pair of recorded speech includes a speech sample with an original accent (the "source" accent) and a speech sample with a desired accent (the "target" accent). Each pair is apparently from the same speaker, regardless of whether a particular speech sample was an original recording of the speaker or the output of the VC model from another speaker. By providing a sufficient number of speech samples according to the same source and target accents, the AC ML can be trained to accept speech having one accent and convert it to speech having the desired accent. Further, if the set of original speech samples represents more than two accents, multiple different AC models can be trained and made available to the virtual conference provider.

During a virtual conference, if a participant is having difficulty understanding another participant, they can select an option available within their virtual conference client software to convert the accent for that other participant. The request is then provided to the virtual conference provider, which selects the appropriate AC model and performs accent conversion. The accent-converted speech is then provided to the requesting participant. Because the accent conversion retains the identity characteristics of the original speaker, but changes the accent, the requesting participant will simply perceive that the speaker's accent has changed, but not their voice.

Such functionality can enable participants in a virtual conference to more easily understand each other, which can significantly enhance the virtual conference experience and enable clear communication between all participants. Furthermore, multiple participants can each receive a speaker's speech but with different accents, allowing for better collaboration.

This illustrative example is given to introduce the reader to the general subject matter discussed herein and the disclosure is not limited to this example. The following sections describe various additional non-limiting examples and examples of accent conversion for virtual conferences.

Referring now to FIG. 1, FIG. 1 shows an example system 100 that provides videoconferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 120 can be located within a private network to provide video conferencing services to devices within the private network, or it can be connected to a public network, e.g., the internet, so it may be accessed by anyone. Some examples may even provide a hybrid model in which a virtual conference provider 120 may supply components to enable a private organization to host private internal virtual conferences or to connect its system to the virtual conference provider 120 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity.

Figure 2:
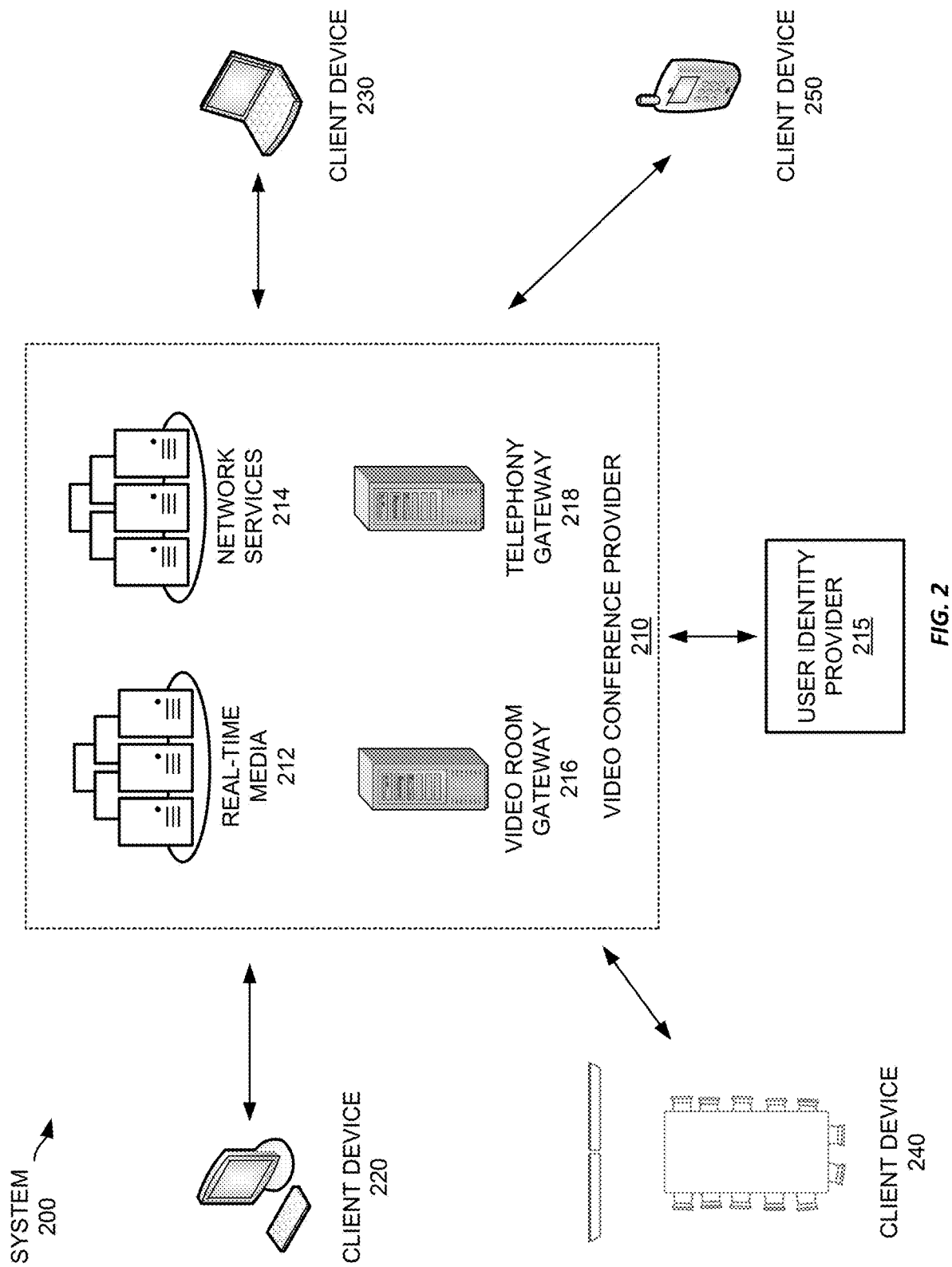

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted multimedia streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a virtual conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the virtual conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the virtual conference provider 210 may receive multimedia streams from the various participants and publish those streams to the various participants to subscribe to and receive. Thus, the virtual conference provider 210 notifies a client device, e.g., client device 220, about various multimedia streams available from the other client devices 230-250, and the client device 220 can select which multimedia stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted multimedia streams at the virtual conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the virtual conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 214 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3A:
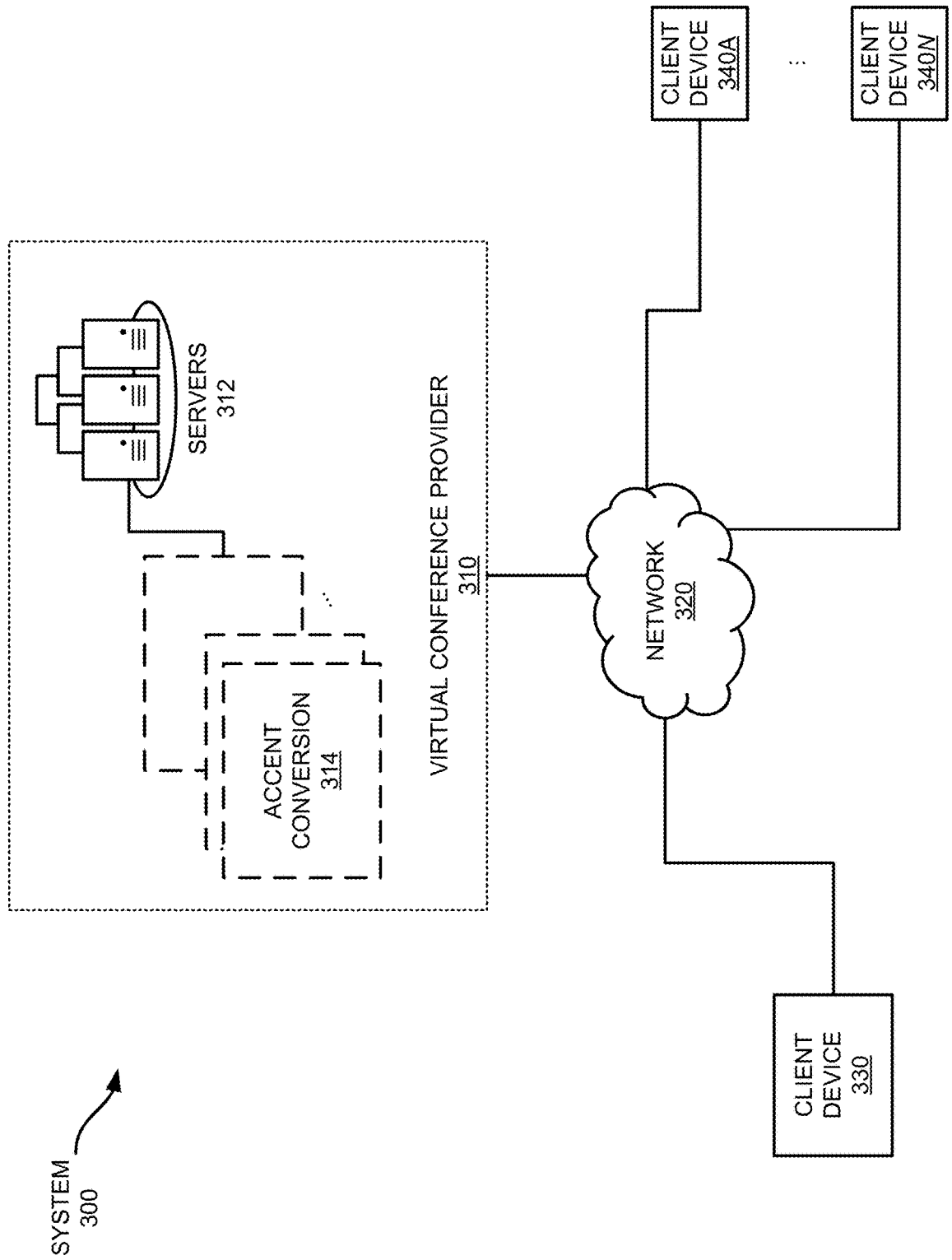
FIG. 3A shows an example system for accent conversion for virtual conferences.
Figure 3B:
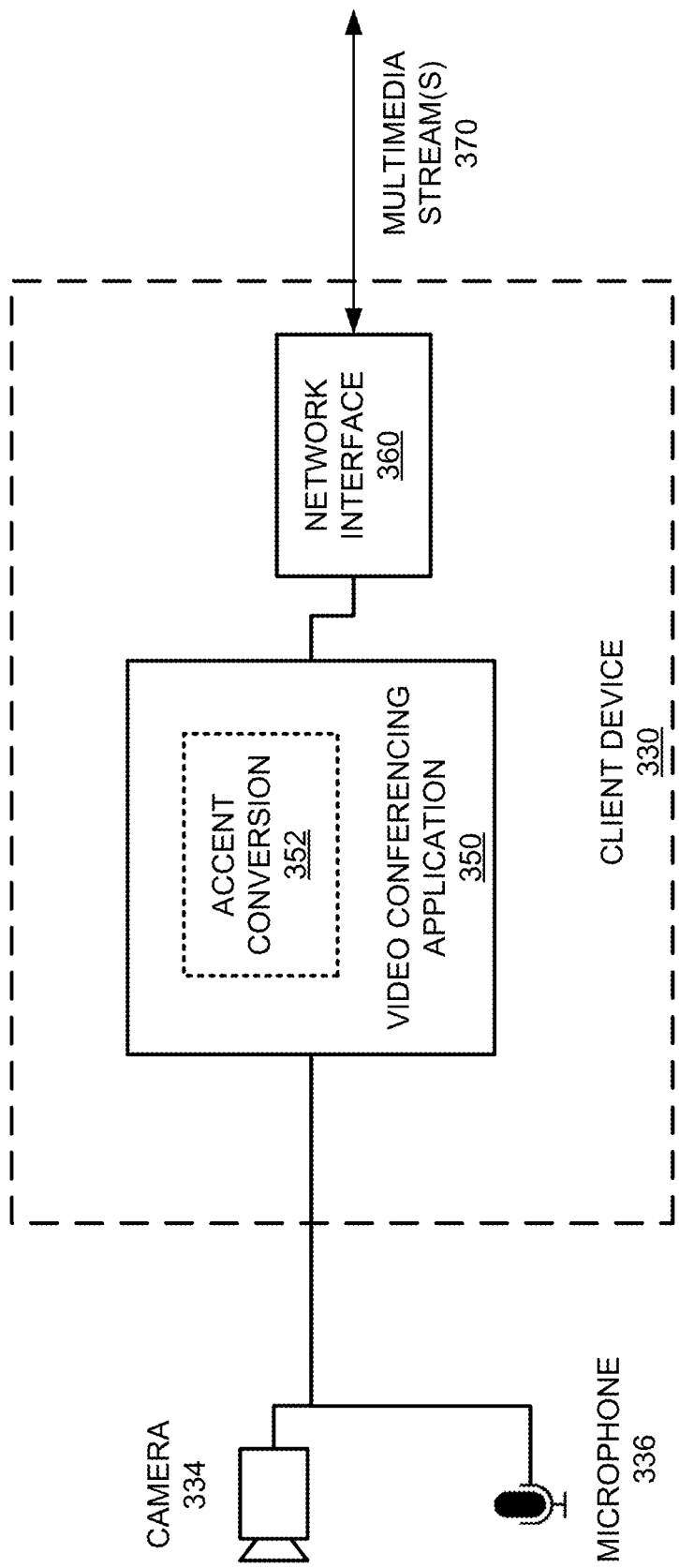
FIG. 3B shows an example client device for accent conversion for virtual conferences.

Referring now to FIGS. 3A-3B, FIG. 3A shows an example system 300 for accent conversion for virtual conferences. The system 300 includes a virtual conference provider 310, which can be connected to multiple client device 330, 340*a-n* via one or more intervening communication networks 320. In this example, the communications network 320 is the internet, however, any suitable communications network or combination of communications network may be employed, including LANs (e.g., within a corporate private LAN), WANs, etc.

Each client device 330, 340*a-n* executes virtual conference software that connects to the virtual conference provider 310 and joins a meeting. During the meeting, the various participants (using virtual conference software or "client software" at their respective client devices 330, 340*a-n*) are able to interact with each other to conduct the meeting, such as by viewing video feeds and hearing audio feeds from other participants, and by capturing and transmitting video and audio of themselves.

Accent conversion is provided by one or more AC processes 314 executed by one or more servers 312 maintained by the virtual conference provider 310 that can be executed and allocated to virtual conferences hosted by the virtual conference provider 310. The AC processes 314 in this example employ a respective trained AC model to convert speech having a source accent to speech having a target accent. In this example, each trained AC model is trained to convert one source accent to one target accent; however, different trained AC models may be employed. Some trained AC models may be trained to accept multiple source accents and convert to a single target accent, while others may be trained to accept one source accent and convert it to any of multiple target accents. Further, some trained AC models may be trained to accept multiple source accents and convert them to any of multiple target accents.

Client device 330, 340a-n may join virtual conferences hosted by the virtual conference provider 310 by connecting to the virtual conference provider and joining a desired virtual conference, generally as discussed above with respect to FIGS. 1-2. Once the participants have joined the conference, they may interact with each other by exchanging audio and video feeds. However, if a participant has difficulty understanding another participant's speech due to their accent, they may request accent conversion. If a participant believes others may have difficulty understanding their speech due to their accent, the participant may also request accent conversion for themselves.

To request AC services, a participant may select an option within their client software to enable accent conversion. They may then select a source accent, one or more participants, and a target accent for the accent conversion. The client software then sends a request to the virtual conference provider 310 for the selected AC services.

In some examples, a host may configure a meeting to employ accent conversion. To do so, the host may select an invitee or a participant in the meeting and select the desired accent conversion functionality, such as the source and target accents. Such functionality may be performed in advance of the meeting to ensure the meeting begins smoothly. The host may also select whether the accent-converted audio is to be provided to specific participants or to all participants in the meeting. If different participants have different preferences, they can communicate them to the host, who may adjust accent conversion settings for a particular participant based on their request. For example, if one participant's audio has been selected for accent conversion, different participants may request different target accents according to their particular preferences.

After receiving a request for AC services, the virtual conference provider 310 allocates one or more AC processes 314 to the virtual conference, depending on the capabilities of the available AC processes. In this example, each AC process 314 is trained to convert from a single source accent to a single target accent. Thus, for each pair of requested source and target accents, an appropriate process 314 may be selected. However, example systems according to this disclosure may employ AC processes 314 that can convert from multiple source accents to multiple target accents, from a single source accent to multiple target accents, or from multiple source accents into a single target accent.

The AC process(es) 314 receive audio streams from the virtual conference and each generates an output audio stream having the corresponding target accent. The generated output audio stream(s) can then be provided to the requesting participants instead of the original unaltered audio stream. Further, to avoid making any participant feel self-conscious about their accented speech, the virtual conference provider can provide accent conversion without notifying any participants about any requests for accent conversion. However, in some examples, some or all of the participants can be informed when accent conversion is being used to ensure transparency.

Referring now to FIG. 3B, the client device executes a software client, referred to as the video conferencing application 350 in this example. The video conferencing application 350 receives audio and video data from a microphone 336 and a camera 334, respectively, connected to the client device 330. During a virtual conference, the video conferencing application 350 encodes the received audio and video data and transmits them to the network as multimedia streams 370 using a network interface 360. In addition, the video conferencing application 350 receives audio and video streams from the virtual conference provider 310 for presentation to the user.

In this example, the video conferencing application 350 includes accent conversion functionality 352 that includes one or more trained AC models, such as those described above with respect to FIG. 3A. The AC functionality 352 can receive incoming audio streams that have speech with a source accent and convert it to speech having a target accent, while retaining the identity characteristics of the original speaker. In this example, the AC functionality 352 can operate on an audio stream received from the microphone 336 or it can operate on one or more audio streams received from other participants in a virtual conference. Consequently, the client device 330 can receive requests from other participants at remote client devices, e.g., client devices 340a-n, for accent conversion, which can be performed at the client device 330, or the client device 330 can receive a request from its own user for accent conversion to be performed on incoming audio streams from one or more other participants. Such a software client may enable accent conversion in scenarios where a virtual conference provider 310 lacks AC processes 314 or in virtual conferences that are end-to-end ("E2E") encrypted. In an E2E-encrypted virtual conference, the virtual conference provider 310 does not have access to unencrypted audio streams. Thus, it cannot perform accent conversion, even if one or more participants requests accent conversion. Instead, accent conversion must be performed by one or more of the client devices participating in the E2E-encrypted virtual conference.

Figure 4A:
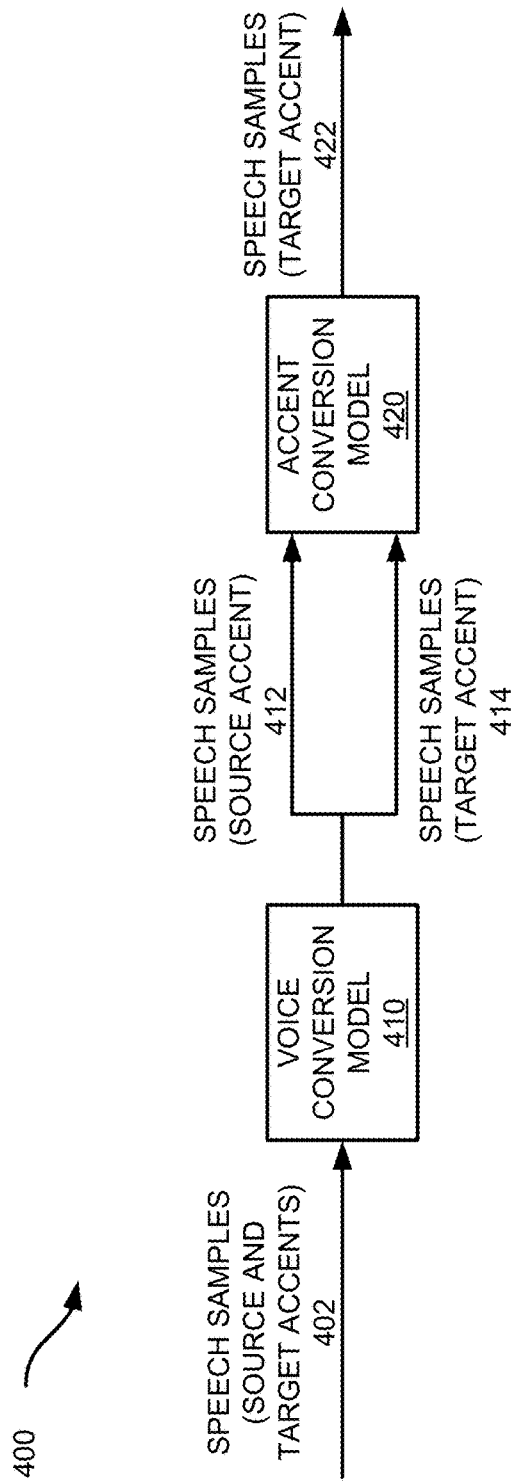
FIGS. 4A-4B shows an example training process for accent conversion for virtual conferences.
Figure 4B:
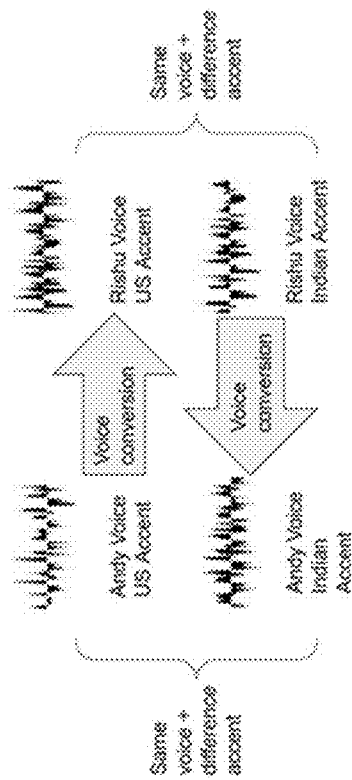

Referring now to FIGS. 4A-4B, FIG. 4A shows an example training process 400 for accent conversion for virtual conferences. The training process 400 involves two different ML models: a voice conversion (VC) model 410 and an accent conversion (AC) model 420. The VC model 410 has been trained to receive incoming audio streams that include speech and adjust identity characteristics of that speech, such as timbre and pitch, to sound like a target speaker. For example, the VC model 410 receives speech from speaker A and adjusts the identity characteristics to output speech that sounds like it was spoken by speaker B, but having the same accent. The VC model 410 can be used to generate companion audio to an input audio sample to generate a pair of audio samples used to train the AC model 420. In contrast, the AC model 412 will be trained to retain the speaker's identity characteristics while adjusting the speech patterns from their natural accent to speech patterns representative of a target accent. Different accents typically involve speech patterns with different pronunciation patterns, cadences, or prosody. Thus, when a person's speech is sampled, it includes those speech patterns. To perform accent conversion, a trained AC model 412 can modify the speech patterns in an input speech sample to output speech 422 with speech patterns characteristic of another accent.

In a simple example with two speakers, where each speaks a common language, but with a different accent, the two speakers are recorded speaking a sets of words and phrases. These recordings are then provided to the VC model 410, which performs voice conversion for each of the two speakers on the recorded audio. For example, if speaker A speaks the phrase "the quick brown fox" with one accent, and speaker B speaks that same phrase with another accent, these two speech samples can be provided to the VC model 410, which performs voice conversion on each speech sample to the other speaker's voice. This results in the following four recorded speech samples: (1) speaker A's original recording, (2) a voice-converted version of speaker B's original recording in speaker A's voice, (3) speaker B's original recording, (2) a voice-converted version of speaker A's original recording in speaker B's voice, an example of which is shown in FIG. 4B. Thus, for each speaker, there are two recordings in their own voice, but with two different accents. For speaker A, the two samples are speaker A's original recording in their native accent and the second recording in speaker B's native accent, but voice-converted into speaker A's voice. Likewise, speaker B also has two associated voice samples: one being the speaker B's original recording in their native accent and the second being a recording of speaker A that has been voice-converted into speaker B's voice, but having speaker A's accent.

And while this example employs two speakers reciting the same words and phrases, some examples may not use such a technique. Instead, the input voice samples may include different recitations of words and phrases. In such an example, the system may extract vocal characteristics of the two speakers that may be used to perform voice and accent conversion irrespective of the specific words and phrases contained within their respective utterances. For example, the system may analyze the two different recordings for similar speech sounds corresponding to speech in one accent and the other accent and subsequently extracting and aligning those sounds to enable transitions between the two, thereby allowing converting between one accent and the other.

These pairs of speech samples are then provided to the AC model 420 as training data from one accent to the other. For example, if the goal is to train the AC model 420 to convert from speaker A's native accent to speaker B's native accent, the original audio from speaker A is provided as the source accent 412 while the voice-converted sample of speaker B's audio is provided as the target accent 414. Thus, speaker B's voice-converted sample will sound like speaker A, but it will retain speaker B's accent, i.e., the target accent. This provides a source and target accent sample in speaker A's voice: one original sample from speaker A and one voice-converted sample from speaker B. Similarly, the voice-converted sample of speaker A's audio is provided as the source audio and the original audio sample from speaker B is provided as the target audio. Thus, speaker A's voice-converted sample will sound like speaker B, but it will retain speaker A's accent, i.e., the source accent. This provides a source and target accent sample in speaker B's voice—one voice-converted sample from speaker A and one original sample from speaker B.

In this example, the AC model 420 is based on an encoder-decoder paradigm with an attention mechanism. The encoder can have two pyramid bi-LSTM (long short-term memory) layers. Each layer has 512 units and downsample factor is 2. Input to the baseline encoder is a mel-filterbank with 80 features. On top of the encoder, a phoneme classifier layer can be added and a connectionist temporal classification loss can be computed.

The baseline decoder employs a neural-network structure as a speech synthesizer decoder with an attention mechanism. The attention mechanism in this example consists of three parts: query layer, key-value layer, and alignment layer. The first two layers produce query vector and sequence of key-value vectors which are of the same dimension; in other words, query, key, and value are processed to be in the same vector space. Then the alignment layer learns the attention weights via a method deployed in this vector space. The first step of the decoding process composes a query for the attention mechanism, defined as equation 2 (below) where $s_i$ is the hidden-state of the attention-recurrent neural network ("RNN") layer, and $s_{i-1}$ and $c_{i-1}$ are the previous hidden-state and context vector, respectively. Then, the alignment layer of the attention mechanism is defined as equation 3 (below), where $\alpha_i$ is the attention weights at ith decoding step, where Query layer, Memory Layer, and Location Layer are modules of alignment block. The attention mechanism considers three terms to calculate the attention weights. Besides the fundamental query and key-value, previous predictions of attention weights $\alpha_{i-1}$ are also fed into the alignment block. Thus the attention mechanism in the decoder is not only content-based but also location-sensitive.

As by now current attention weights are available, a weighted sum of the key-value sequence is calculated as shown in Equation 4 (below). This weighted sum represents the context information and is referred to as a context vector. Then a decoder-RNN (recurrent neural network) layer is defined as Equation 5 (below), whereby $s_i$ and $c_i$ are concatenated to be fed into this RNN-layer and di is the RNN hidden-state. Finally, the RNN hidden-state is fed to the final prediction layer to get $y_i^{mel}$, which is the spectrogram prediction at decoding step i in Equation 6. The output of the decoder is 80 mel-filter bank features. Mel-filter banks were inspired by the nature of speech signals and how humans perceive them and provide frequency-domain auditory filter banks that use the mel frequency scale.

$$h_{1\ldots n}^x = \text{Encoder}(x_1 \ldots x_N) \tag{1}$$

$$s_i = RNN \text{ Attention}\left(s_{i-1}, \left[\text{Prenet}\left(y_{i-1}^{mel}\right)\right]\right) \tag{2}$$

$$\alpha_i = \text{Attention}(\text{Query}(s_i), \text{Memory}(h_{1\ldots n}^x), \text{Location}(\alpha_{i-1})) \tag{3}$$

$$c_i = \sum_j \alpha_{i,j} * h_j \tag{4}$$

$$d_i = RNN \text{ Decoder}(d_{i-1}, [s_i; c_i]) \tag{5}$$

$$y_i^{mel} = \text{Linear}([d_i; c_i]) \tag{6}$$

$$y_i^{Postnet} = \text{Postnet}\left(y_i^{mel}\right) \tag{7}$$

This model can leverage a pretrained encoder and a speech synthesis decoder as the baseline's decoder. One example pretrained encoder consists of two components: feature encoder and context encoder. The feature encoder consists of temporal convolution layers, takes raw waveform as input, and conducts speech representation. Then they are fed to the context encoder to generate context representations with sequence-level information.

In the pre-training phase, the model is optimized with a contrastive loss to distinguish the true target from distractors and the input to the context encoder is masked partially. The speech representation is discretized by the vector quantization module and used as targets for the contrastive predicting. The pretrained encoder trained on a set of speech recordings in a particular language, such as English, extracts 768-dimensional speech representations that can be used in various embodiments. Different from the baseline encoder, the input of the encoder is a raw audio waveform. On top of the encoder, a phoneme classifier layer is added and the CTC (Connectionist Temporal Classification) loss is computed again.

In the training phase, the final loss function of the accent conversion system can be 1. In various embodiments, the stop loss token is not included in the loss function since is it assumed that an output audio has the same length as an input audio in the inference stage.

$$L = \|Y_{mel} - Y_{mel}^{Decoder}\|_2 + \|Y_{mel} - Y_{Postnet}^{decoder}\|_2 + \text{Loss}_{ctc} \quad (8)$$

A neural vocoder can be used to convert the mel-filterbank features into a raw waveform. Since the mel-spectrogram captures all of the relevant details needed for high-quality speech synthesis, ground-truth 80 mel-filterbanks spectrograms can be used to train the neural vocoder.

To train a voice conversion, audio data from two different corpora of recorded speech can be used. In this example, these corpora have a total of 4 speakers (4 native speakers and 4 Indian accented speakers), and each speaker has audios of the same 1152 sentences. To get a better voice conversion model on all speakers of these corpora, the voice conversion model can be fine-tuned and pretrained on these corpora and do not need to train voice conversion from scratch.

To generate synthetic samples, 1152 sentences can be split into a training set (1052 sentences), validation set (50 sentences), and test set (50 sentences). Each sentence is spoken by 8 speakers (4 native speaker and 4 Indian-accented speaker). After applying the synthetic process, there are eight pairs of audio for each sentence, providing approximately 9000 pairs of audio covering around 9 hours for training the accent conversion model. All of the audio can be sampled at 16 kHz or any other suitable sampling rate.

The accent conversion models can be trained on a single GPU by grouping with a suitable batch size, such as 64, and the gradients are updated periodically, such as every 8 mini-batches, with adaptive scheduling in using a base learning rate, such as 1.5, and a suitable number of warm-up steps, such as 4096.

This particular example has been described in the context of using a training data set having speakers in a particular language and with particular accents; however, it should be appreciated that any number of source or target accents may be used. Moreover, the base language employed may be any language of interest; the techniques discussed above are not specific to English. Thus, these techniques may be used to train an AC model 420 to perform accent conversion in any desired language and between any source and target accent. Moreover, training may performed on multiple source accents or multiple target accents to generate a 1:N AC model, an M:1 AC model, or an M:N AC model, where M and N are each greater than or equal to 1.

Referring now to FIGS. 5A-5D, FIG. 5A illustrates an example GUI 500 for a software client that can interact with a system for accent conversion for virtual conferences. A client device, e.g., client device 330 or client devices 340*a-n*, executes a software client as discussed above, which in turn displays the GUI 500 on the client device's display. In this example, the GUI 500 includes a speaker view window 502 that presents the current speaker in the virtual conference. Above the speaker view window 502 are smaller participant windows 504, which allow the participant to view some of the other participants in the virtual conference, as well as controls ("<" and ">") to let the host scroll to view other participants in the virtual conference.

Beneath the speaker view window 502 are a number of interactive elements 510-530 to allow the participant to interact with the virtual conference software. Controls 510-512 may allow the participant to toggle on or off audio or video streams captured by a microphone or camera connected to the client device. Control 520 allows the participant to view any other participants in the virtual conference with the participant, while control 522 allows the participant to send text messages to other participants, whether to specific participants or to the entire meeting. Control 524 allows the participant to share content from their client device. Control 526 allows the participant to toggle recording of the meeting, and control 528 allows the user to select an option to join a breakout room. Control 530 allows a user to launch an app within the virtual conferencing software, such as to access content to share with other participants in the virtual conference.

In addition to controls 510-530, an accent conversion button 532 is provided by the GUI 500 which allows the user to request accent conversion of one or more audio streams during a virtual conference. When the translation button 532 is selected, the user may be presented with the option to select one or more participants for whom to provide accent conversion and to select one or more source accents corresponding to those participants. In some examples, the virtual conference provider may automatically detect accents and if it detects participants with different accents than the user of the client device 330, the virtual conference provider may select any participants who have a different accent. Alternatively, a user may select one or more accents within their profile as being accents for which they would like accent conversion automatically applied. The user may then select the desired target accent, which is generally their own native accent. In some examples, the virtual conference provider 310 may maintain a profile for the user that includes their native accent. Thus, the virtual conference provider 310 may automatically select the user's native accent as the target accent.

During the normal course of a virtual conference, the user interacts with the virtual conferencing application and other participants via the GUI 500 and via exchanged audio or video streams. And if accent conversion functionality is desired, the user may select the translation button 532.

Figure 5A:
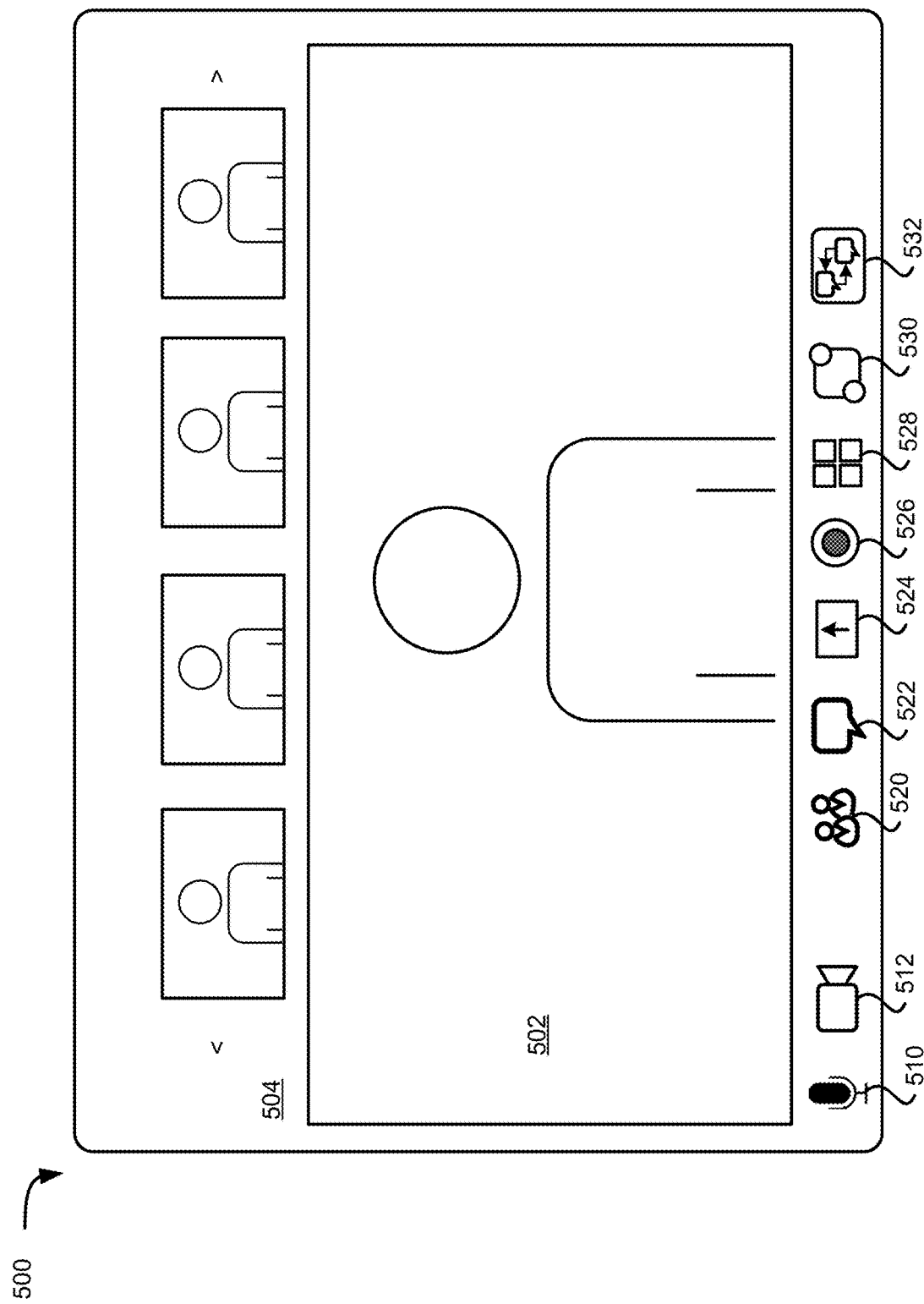
FIGS. 5A-5E show an example graphical user interface for a client device for accent conversion for virtual conferences.
Figure 5B:
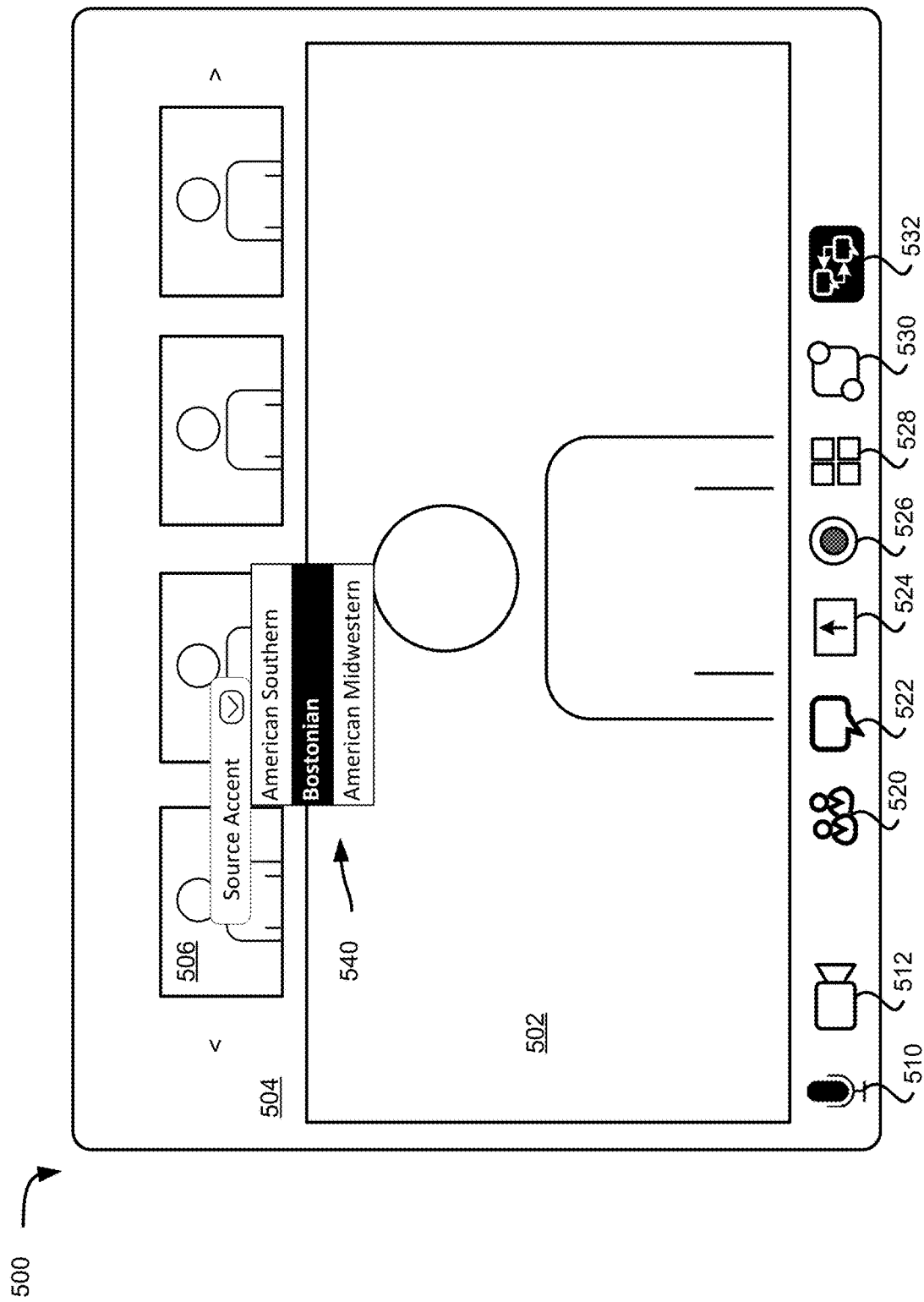

Referring now to FIG. 5B, the user has selected a participant 506 for accent conversion. In this example, the virtual conference is being held in English, though as discussed above, accent conversion may be performed on any language for which an AC model 420 has been trained. After selecting the participant 506, the GUI 500 presents the user with a dropdown list 540 of source accents that can be converted, from which the user has selected "Bostonian." After selecting the source accent, the GUI 500 then requests the user identify the desired target accent.

Figure 5C:
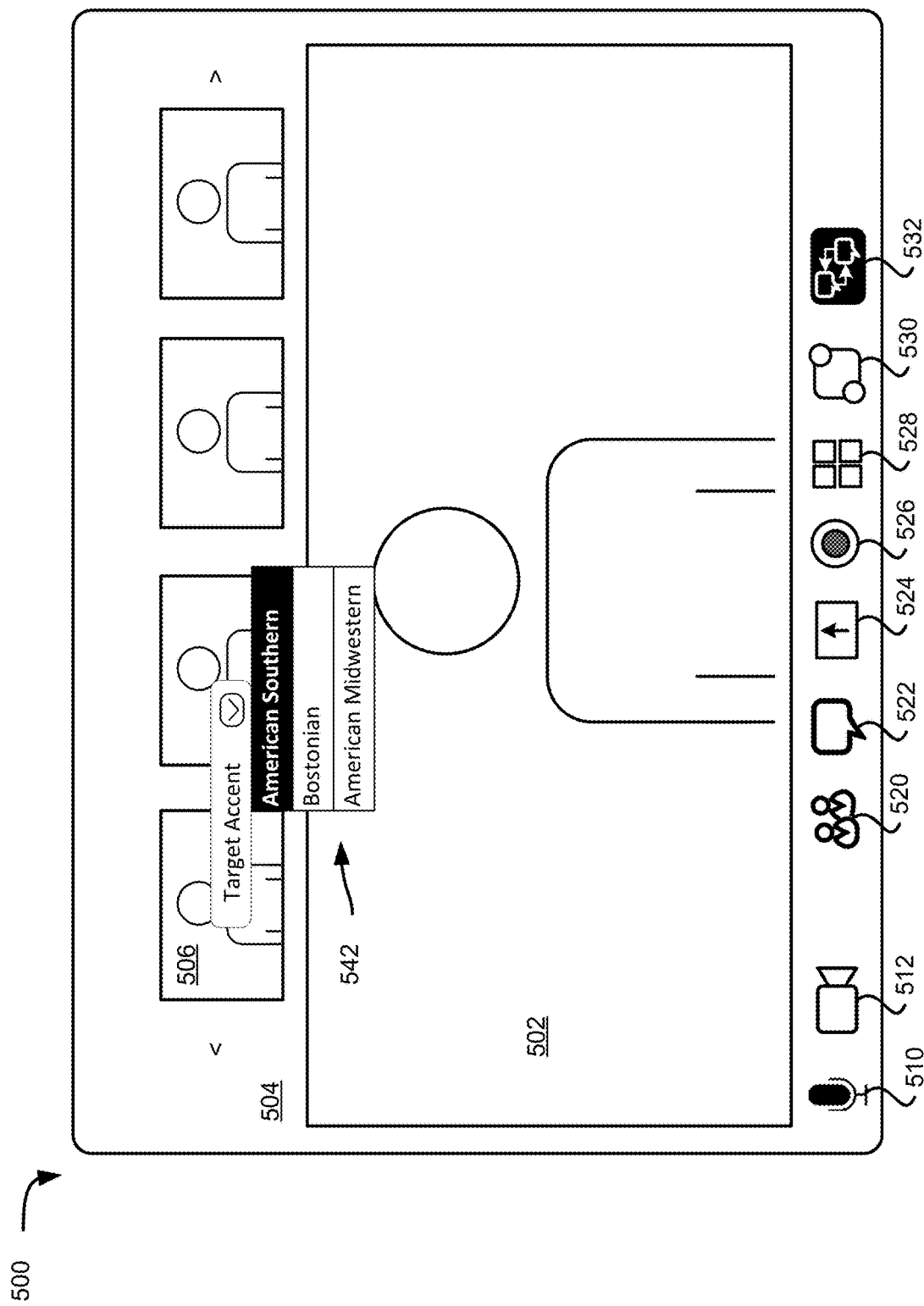

In FIG. 5C, the GUI 500 has presented a second dropdown list 542 with options for target accents available for conversion from a "American Southern" accent. In this case, the user has selected the target accent as "American." After making these selections, an AC model 420 trained to translate from English having a Bostonian accent to English having an American Southern accent is selected.

It should be appreciated that depending on the selected source accent, different sets of target accents may be available. For example, one or more AC models 420 may be trained to convert from a Bostonian accent into American Southern and American Midwestern accents, but for an American Southern source accent, only a Bostonian target accent may be available. This may be due to the different AC models 420 available at the virtual conference provider 310 or within the virtual conferencing application 350 in a particular implementation.

Figure 5D:
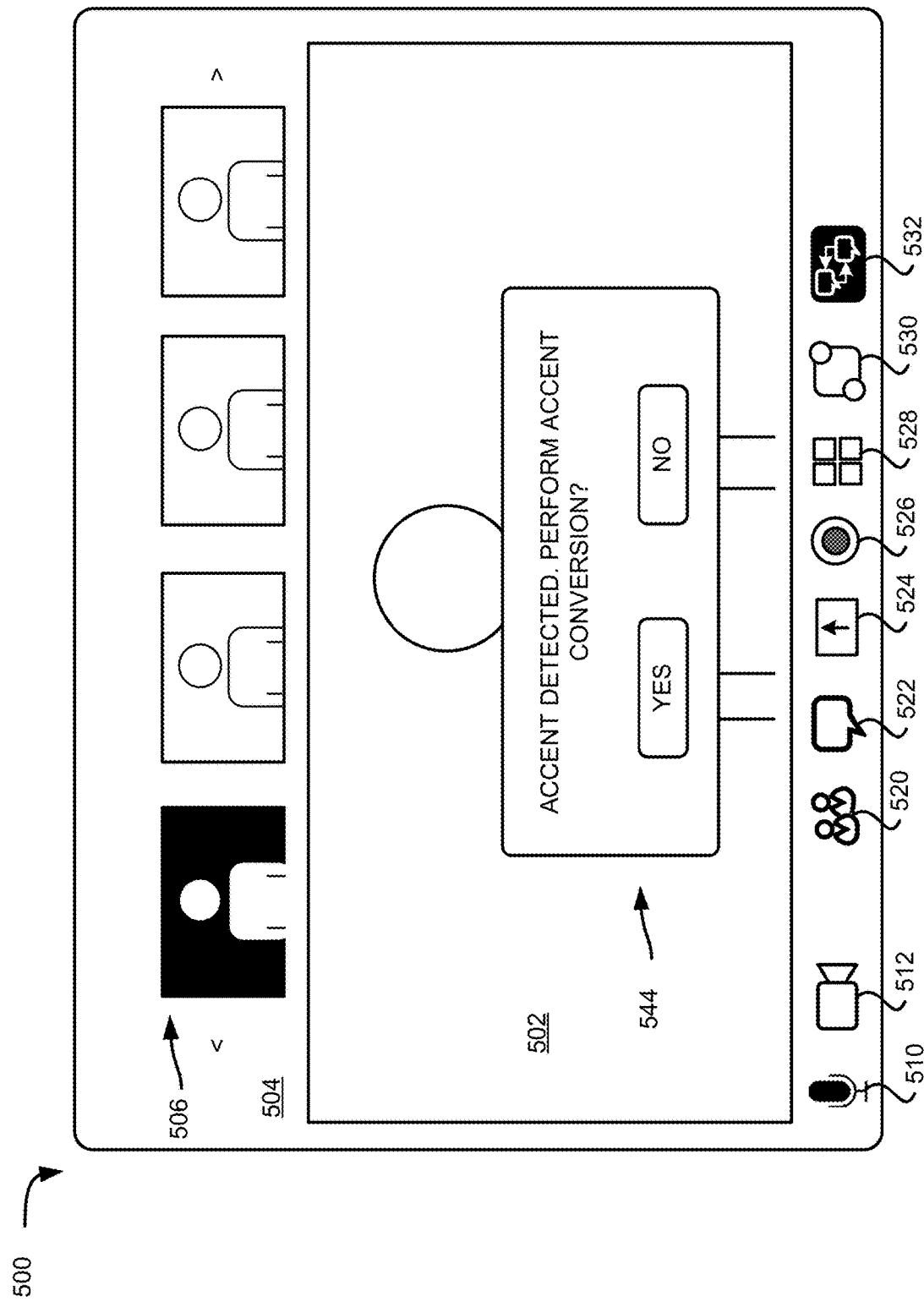

Referring now to FIG. 5D, in some examples, the client device 330 or the virtual conference provider 310 may perform accent detection or may analyze user profiles for participants in a virtual conference to identify accents associated with the different participants. If different accents among the participants are detected, the virtual conference provider 310 may provide an indication to one or more of the client devices to suggest accent conversion. In this example, the virtual conference provider 310 has determined that the highlighted participant 506 has a different accent from the user of the client device 330. Thus, the virtual conference provider 310 has provided an indication of the accent mismatch to the client device 330, which has suggested 544 that the user enable accent conversion for the other participant's audio stream. Similarly, the client device 330 itself could make such a determination and provide the suggestion to the user. If the user accepts the suggestion 544, a response may be sent to the virtual conference provider 310 to cause it to perform accent conversion. Alternatively, the client software 350 may enable its accent conversion functionality 352 to perform accent conversion.

After making the appropriate selections, the request for accent conversion is provided to the virtual conference provider 310, to another client device 340a-n, or is handled locally at the client 330.

Figure 5E:
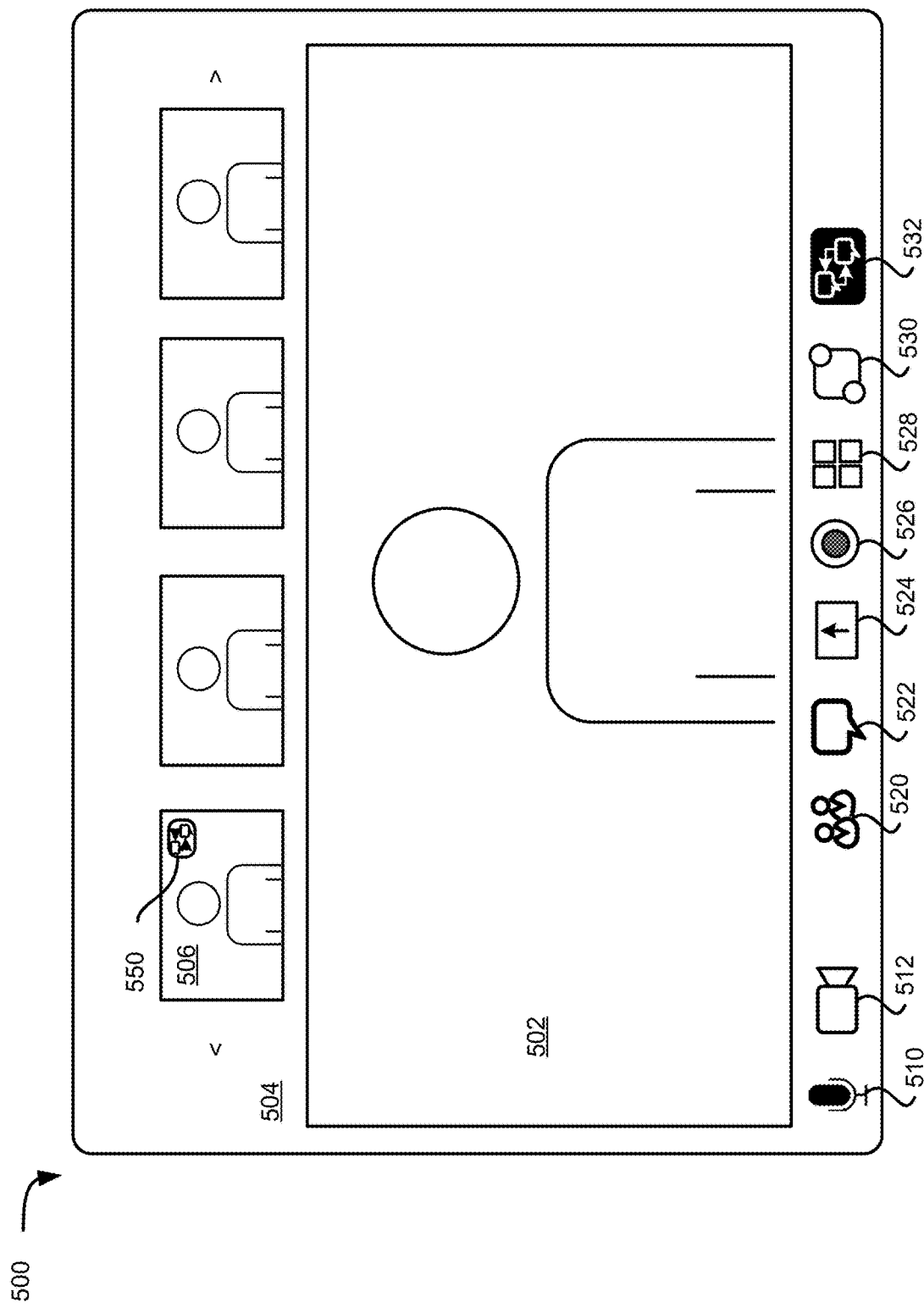

Referring now to FIG. 5E, after accent conversion has been enabled for a particular participant, the video conferencing application 350 may provide an indicator 550 that accent conversion is being performed for the particular participant. In this example, a graphical icon is overlaid on the participant's video feed within the GUI 500. In other examples, different indicators may be used. Further, as discussed above, in some examples, indicators may be displayed for all participants to ensure everyone is aware that accent conversion is being used, though in some cases, the indicator may only be shown to the participant who requested accent conversion or based on the host's configuration of the meeting.

Figure 6:
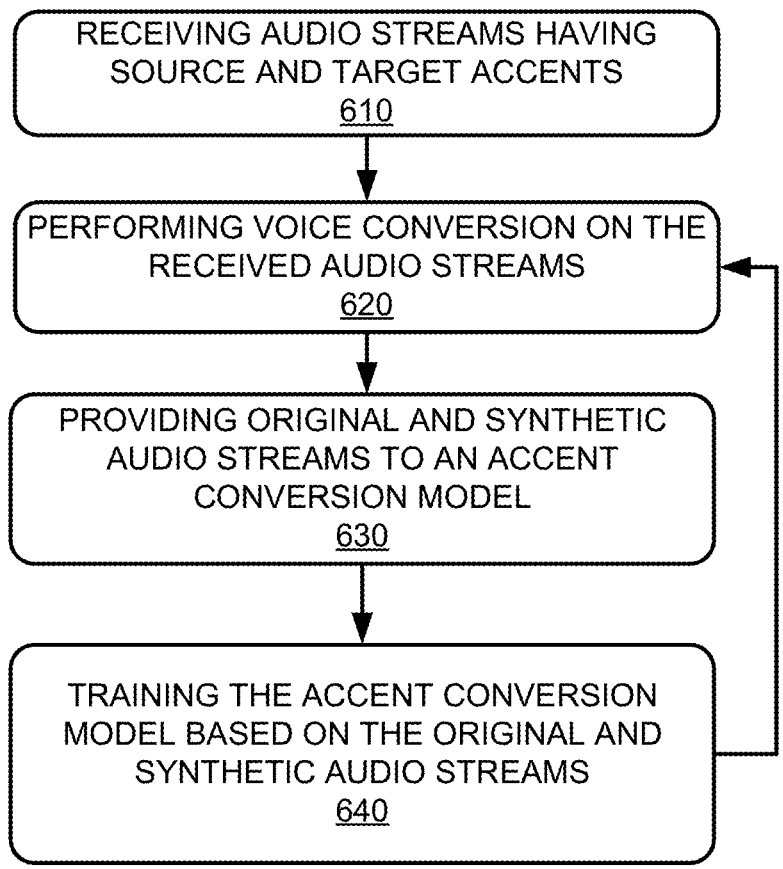
FIGS. 6-7 show example methods for accent conversion for virtual conferences.

Referring now to FIG. 6, FIG. 6 shows an example method 600 for accent conversion for virtual conferences. The example method 600 will be described with respect to the system shown in FIGS. 4A-4B; however, any suitable system according to this disclosure may be employed, such as the systems shown in FIGS. 3A-3B.

At block 610, a computing device receives audio streams of speech from multiple speakers. In this example, the audio streams include recorded speech samples of a set of predefined phrases that are each spoken by multiple different speakers representing at least two different accents. Each speaker is recorded speaking each of the phrases in their native accents and the recordings are stored in memory of the computing device. However, in some examples, the speech samples may be received in real-time from the speakers.

At block 620, a VC model 410 performs voice conversion on the speech samples to generate synthetic audio for those speech samples. The voice conversion allows a speech sample from one speaker having one accent to be converted into the voice of another of the speakers who has a different accent. Thus, each speaker has at least two recordings in their voice for each phrase, whether an original recording or a synthetic recording. In addition, because some of the different speakers have different accents, if chosen appropriately, the recordings for a particular phrase will include at least two for each speaker (original or synthetic) in different accents. For example, if speakers A and B, with different accents from each other, each record a speech sample of a phrase, the VC model 410 can generate a synthetic recording for speaker A from speaker B, and for speaker B from speaker A. This creates two samples for speaker A: (1) an original recording of the phrase in speaker A's original accent, and (2) a synthetic recording of the phrase converted to speaker A's voice but having speaker B's accent. It also creates a pair for speaker B. This process is then performed across the various recordings to create pairs of speech recordings for each speaker, thereby creating sets of training pairs for the AC model 420.

At block 630, pairs of audio streams for a particular speaker, one original recording having one accent and one synthetic recording having another accent, are provided to the AC model 420 as training audio streams. The synthetic recording is a recording of the same phrase, but from another speaker that has been voice-converted to sound as though it is coming from the particular speaker. One audio stream is provided as an audio stream having a source accent and the other audio stream is provided as an audio stream having a target accent.

At block 640, the AC model 420 is trained based on the received pair of audio streams. For example, the AC model 420 generates an output audio stream having the target accent from the audio stream having the source accent. The output audio stream and the audio stream having the target accent are then used to train the AC model 420, such as described above with respect to FIG. 4. The method 600 then returns to either block 620 or 630 to continue to obtain and provide pairs of training audio streams to the AC model 420. Once sufficient training samples have been provided to the AC model 420, additional samples can be used to validate the training and determine if additional training is required.

Figure 7:
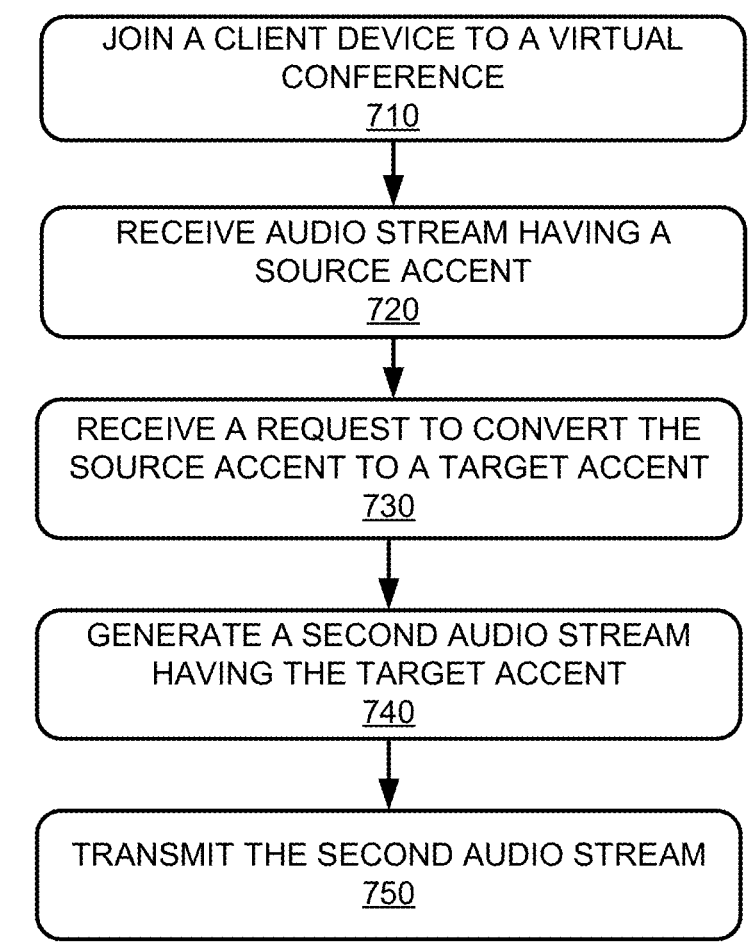

Referring now to FIG. 7, FIG. 7 shows an example method 700 for accent conversion for virtual conferences. The example method 700 will be described with respect to the system shown in FIGS. 3A-3B, but any suitable systems according to this disclosure, such as the systems 100, 200 shown in FIGS. 1-2, may be used.

At block 710, a client device 330 joins a virtual conference hosted by a virtual conference provider 310. In this example, the virtual conference provider 310 receives a request from the client device 330 to join the virtual conference and joins the client device 330 to the virtual conference generally as described above with respect to FIGS. 1-2.

At block 720, the virtual conference provider 310 receives an audio stream having a source accent from one of the client devices 340a connected to the virtual conference. As discussed above with respect to FIGS. 1-2, client devices participating in a virtual conference can provide audio and video streams to the virtual conference provider, which then provides them to one or more of the other participants to enable the participants to interact with each other.

In some examples, the client device 330 receives an audio stream from a microphone 336, where the audio stream includes speech from the user of the client device 330. In addition, the client device 330 can receive one or more audio streams from the virtual conference provider 310 that originated with other participants in the virtual conference.

At block 730, the virtual conference provider 310 receives a request to convert a source accent to a target accent in a received audio stream. In this example, the virtual conference provider 310 receives a request from the client device 330 to convert audio from another participant in the virtual conference to a selected target accent. The request may identify the source accent or the target accent, or it may only identify one or more participants in the virtual conference. In some examples the request may be generated by user input within a GUI 500, such as discussed above with respect to FIGS. 5B-5C.

In some examples, accent conversion may be automatically requested by a user's client software 350 or by the virtual conference provider 310. For example, a user may establish a user profile with the virtual conference provider that may include accent information for the user. During a virtual conference, the virtual conference provider 310 or the user's client device 330 may perform accent detection on audio streams within the virtual conference. If any of the audio streams are detected to include speech having an accent different from the user's accent identified in the user profile, the virtual conference provider 310 or the user's client software 350 may automatically perform accent conversion for those audio streams with detected different accents, so long as a suitable AC model is available to perform the accent conversion.

In some examples, rather than automatically performing accent conversion, the client software may provide a suggestion to perform accent conversion as discussed above with respect to FIG. 5D. For example, the virtual conference provider 310 may transmit an indication to the client software that accent conversion is available from the speaker's accent to the user's accent. In response to receiving that indication, the client software 350 may display a suggestion to perform accent conversion on the speaker's audio stream. If the user accepts the suggestion, a request for accent conversion may be transmitted.

In some examples, the client device 330 may receive the request to convert the source accent to a target accent, such as based on a user selecting an accent conversion option 532 in a GUI of a client application or from another participant in the virtual conference. The request may identify a target accent and one or more other participants in the virtual conference or it may identify one or more source accents to convert. The client device 330 may then provide the request to the virtual conference provider 310 or it may process the request locally.

It should be appreciated that, as discussed above, because accent conversion may be performed at the client device 330, the virtual conference provider 310 may not receive a request for accent conversion in some examples. Instead, a user selection for accent conversion may be used by the client software 350 itself to begin accent conversion. Alternatively, the request for accent conversion may be received from the client device 330 by another client device within the virtual conference. For example, if a user requests accent conversion for another participant in the conference, the request for accent conversion may be sent to the other participant's client device to cause it to perform accent conversion. Such examples may be useful in E2E-encrypted virtual conferences where the virtual conference provider 310 cannot access the multimedia streams exchanged between the participants and thus cannot perform accent conversion.

At block 740, the virtual conference provider 310 generates, using an AC model 314, a second audio stream based on a received audio stream. The second audio stream is generated by the AC model 314 to output speech according to a target accent based on the received audio stream. In this example the AC model 314 was trained according to the disclosure above with respect to FIGS. 4 and 6.

In some examples, however, the client device 330 rather than the virtual conference provider 310 may generate the second audio stream using an accent conversion functionality 352 based on a received audio stream. As discussed above, a virtual conference provider 310 may not provide accent conversion or the client device 330 may be connected to an E2E-encrypted virtual conference where the virtual conference provider 310 cannot decrypt encrypted audio streams exchanged during the virtual conference. Thus, accent conversion may be done by the client device 330. Similarly, accent conversion may be performed by another client device 340a-n within the virtual conference based on a request sent by a participant in the virtual conference.

In the example discussed above, the generated audio stream, each audio stream 422, is generated to have the selected accent while having the same voice characteristics as the original speaker. In some examples, however, the AC model may be trained to allow the user to select a desired output voice as well as the output accent. For example, the system may employ a trained VC model as a part of the accent conversion software 352 to first convert the user's voice to sound like a different person, such as a celebrity or a fanciful voice like a robot, before providing the voice-converted audio to the AC model to provide accent conversion. Thus, users could make selections to both change the accent of a participant's speech, but also change their voice characteristics as well.

At block 750, the virtual conference provider 310 transmits the second audio stream to the client device 330 for output. However, if the client device 330 generated the second audio stream, the client device 330 may transmit the second audio stream to speakers or headphones to be output to the user. Similarly, if another client device 340a-n generated the second audio stream, that client device 340a-n may transmit the second audio stream to the client device 330 for output.

It should be appreciated that multiple participants may all request the same accent conversion. For example, multiple participants in a virtual conference may have a common accent, but one participant may have a different accent. Thus, some or all of the participants with the common accent may request accent conversion for the different accent. The virtual conference provider 310 may generate a single second audio stream from performing accent conversion on the different accent and then distribute that second audio stream to each of the participants that requested accent conversion. Such an approach can reduce processing burdens that might accrue if the same accent conversion operation was separately performed for each different request.

Figure 8:
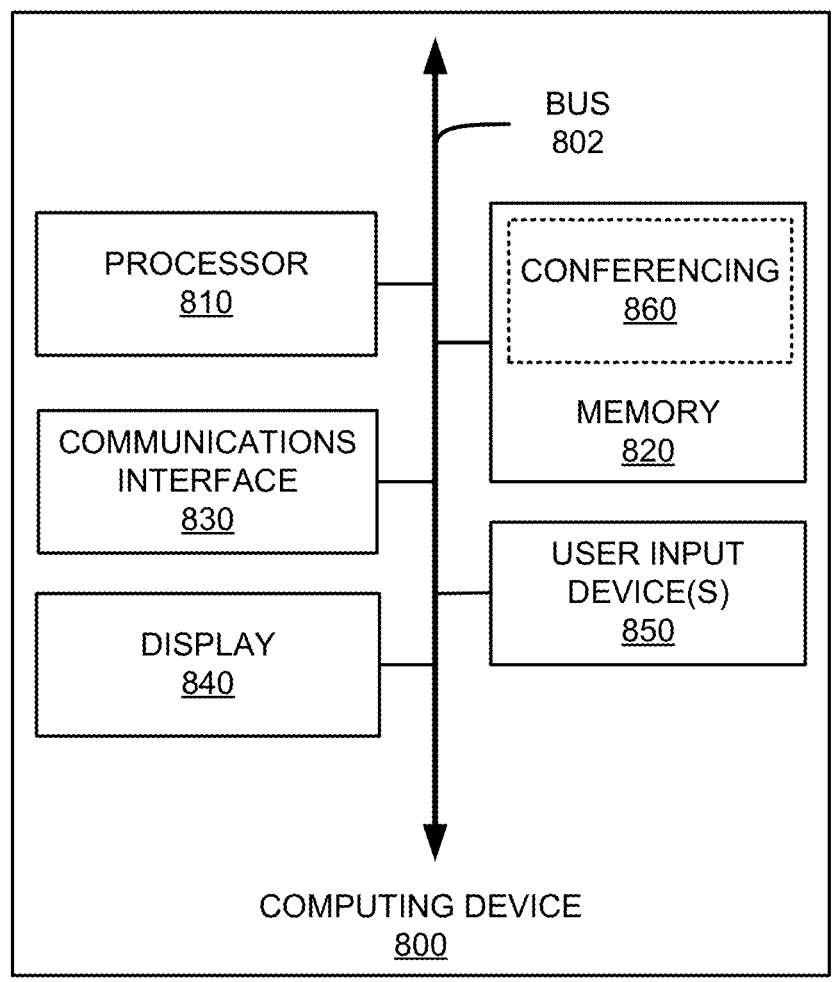
FIG. 8 shows an example computing device suitable for use with example systems and methods for accent conversion for virtual conferences.

Referring now to FIG. 8, FIG. 8 shows an example computing device 800 suitable for use in example systems or methods for accent conversion for virtual conferences according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for accent conversion for virtual conferences according to different examples, such as part or all of the example methods 600, 700 described above with respect to FIGS. 6 and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a virtual conferencing application 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating virtual conference expos, etc., such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array ("FPGA") specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory ("RAM") coupled to the processor. The processor executes computer-executable program instructions stored in memory, such as executing one or more computer programs. Such processors may comprise a microprocessor, a digital signal processor ("DSP"), an application-specific integrated circuit ("ASIC"), field programmable gate arrays ("FPGAs"), and state machines. Such processors may further comprise programmable electronic devices such as PLCs, programmable interrupt controllers ("PICs"), programmable logic devices ("PLDs"), programmable read-only memories ("PROMs"), electronically programmable read-only memories ("EPROMs" or "EEPROMs"), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, during a virtual conference hosted by a virtual conference provider, a first audio stream comprising speech according to a first voice having first speech patterns according to a first accent, the first audio stream received from a first client device associated with a first participant in the virtual conference;
   generating, by a first trained machine learning ("ML") model, a second audio stream comprising the speech having second speech patterns according to a second accent and in the first voice, wherein the first trained ML model was trained according to pairs of training audio streams, each pair of training audio streams comprising:
      a respective first training audio stream comprising first speech uttered by a first speaker having a first training voice having first identity characteristics, the respective first training audio stream having first training speech patterns according to a first training accent, the first speech comprising a first set of words; and
      a respective third training audio stream generated by a second trained ML model based on a respective second training audio stream, the respective second training audio stream comprising second speech uttered by a second speaker having a second training voice having second identity characteristics, the second speech having second training speech patterns according to a second training accent, the respective third training audio stream comprising third speech according to the first identity characteristics and having the second training speech patterns according to the second training accent, the second speech comprising a second set of words; and
   outputting the second audio stream.

2. The method of claim 1, wherein the first speech patterns comprise pronunciation patterns, cadence, and prosody.

3. The method of claim 1, wherein the first identity characteristics comprise a first timbre and first pitch and the second identity characteristics comprise a second timbre and second pitch, the first identity characteristics different from the second identity characteristics.

4. The method of claim 1, wherein the first audio stream is provided by a client device associated with a participant, further comprising:
   joining the client device to a virtual conference hosted by a virtual conference provider; and receiving a request to convert the first audio stream to the second accent.

5. The method of claim 4, wherein the request is received from the participant.

6. The method of claim 4, wherein the request is received from another participant in the virtual conference.

7. The method of claim 6, wherein the participant is not informed of the request.

8. The method of claim 4, wherein generating the second audio stream is performed by the virtual conference provider, and the second audio stream is output to participants of the virtual conference other than the participant.

9. The method of claim 1, further comprising:
receiving a third audio stream comprising second speech having third speech patterns according to a third accent;
generating, by the first trained ML model, a fourth audio stream comprising the second speech having fourth speech patterns according to a fourth accent; and
outputting the fourth audio stream.

10. The method of claim 1, wherein the first audio stream is provided by a client device associated with a participant, further comprising:
joining the client device to a virtual conference hosted by a virtual conference provider;
receiving a third audio stream from a second client device associated with a second participant, the third audio stream comprising second speech having the second speech patterns according to the second accent;
determining that the first and second accents are different based on detecting the first accent in the first audio stream and detecting the second accent in the second audio stream; and
providing a suggestion to each of the client device and the second client device to perform accent conversion based on the first and second accents being different.

11. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive, during a virtual conference hosted by a virtual conference provider, a first audio stream comprising speech according to a first voice having first speech patterns according to a first accent, the first audio stream received from a first client device associated with a first participant in the virtual conference;
generate, by a first trained machine learning ("ML") model, a second audio stream comprising the speech having second speech patterns according to a second accent in the first voice, wherein the first trained ML model was trained according to pairs of training audio streams, each pair of training audio streams comprising:
a respective first training audio stream comprising first speech uttered by a first speaker having a first training voice having first identity characteristics, the respective first training audio stream having first training speech patterns according to a first training accent, the first speech comprising a first set of words; and
a respective third training audio stream generated by a second trained ML model based on a respective second training audio stream, the respective second training audio stream comprising second speech uttered by a second speaker having a second training voice having second identity characteristics, the second speech having second training speech patterns according to a second training accent, the respective third training audio stream comprising third speech according to the first identity characteristics and having the second training speech patterns according to the second training accent, the second speech comprising a second set of words; and
output the second audio stream.

12. The system of claim 11, wherein the first speech patterns comprise pronunciation patterns, cadence, and prosody.

13. The system of claim 11, wherein the first identity characteristics comprise a first timbre and first pitch and the second identity characteristics comprise a second timbre and second pitch, the first identity characteristics different from the second identity characteristics.

14. The system of claim 11, wherein the first audio stream is provided by a client device associated with a participant, and wherein the one or more processors are configured to execute further processor-executable instructions stored in the non-transitory computer-readable medium to:
join the client device to a virtual conference hosted by a virtual conference provider; and
receive a request to convert the first audio stream to the second accent.

15. The system of claim 11, wherein the first audio stream is provided by a client device associated with a participant, and wherein the one or more processors are configured to execute further processor-executable instructions stored in the non-transitory computer-readable medium to:
join the client device to a virtual conference hosted by a virtual conference provider;
receive a third audio stream from a second client device associated with a second participant, the third audio stream comprising second speech having the second speech patterns according to the second accent;
determine that the first and second accents are different based on detecting the first accent in the first audio stream and detecting the second accent in the second audio stream; and
provide a suggestion to each of the client device and the second client device to perform accent conversion based on the first and second accents being different.

16. A non-transitory computer-readable medium comprising processor-executable instructions configured to cause one or more processors to:
receive, during a virtual conference hosted by a virtual conference provider, a first audio stream comprising speech according to a first voice having first speech patterns according to a first accent, the first audio stream received from a first client device associated with a first participant in the virtual conference;
generate, by a first trained machine learning ("ML") model, a second audio stream comprising the speech having second speech patterns according to a second accent in the first voice, wherein the first trained ML model was trained according to pairs of training audio streams, each pair of training audio streams comprising:
a respective first training audio stream comprising first speech uttered by a first speaker having a first training voice having first identity characteristics, the respective first training audio stream having first training speech patterns according to a first training accent, the first speech comprising a first set of words; and a respective third training audio stream generated by a second trained ML model based on a respective second training audio stream, the respective second training audio stream comprising second speech uttered by a second speaker having a second training voice having second identity characteristics, the second speech having second training speech patterns according to a second training accent, the respective third training audio stream comprising third speech according to the first identity characteristics and having the second training speech patterns according to the second training accent, the second speech comprising a second set of words; and output the second audio stream.

17. The non-transitory computer-readable medium of claim 16, wherein the first audio stream is provided by a client device associated with a participant, and further comprising processor-executable instructions configured to cause one or more processors to:
join the client device to a virtual conference hosted by a virtual conference provider; and
receive a request to convert the first audio stream to the second accent.

18. The non-transitory computer-readable medium of claim 17, wherein generating the second audio stream is performed by the virtual conference provider, and further comprising processor-executable instructions configured to cause one or more processors to output the second audio stream to participants of the virtual conference other than the participant.

* * * * *